United States Patent [19]
Mizuno et al.

[11] Patent Number: 5,242,049
[45] Date of Patent: Sep. 7, 1993

[54] CASE FOR A DISC CARTRIDGE

[75] Inventors: Tomio Mizuno, Tokyo; Shinkichi Kobayashi, Shizuoka, both of Japan

[73] Assignee: Sony Corporation, Tokyo, Japan

[21] Appl. No.: 936,598

[22] Filed: Aug. 27, 1992

[30] Foreign Application Priority Data

Sep. 4, 1991 [JP] Japan ................................. 3-253109

[51] Int. Cl.⁵ ...................... B65D 81/10; B65D 85/30
[52] U.S. Cl. .................................. 206/313; 206/591; 206/587
[58] Field of Search ............... 206/313, 587, 309, 310, 206/311, 444, 591

[56] References Cited
U.S. PATENT DOCUMENTS 3,211,282 10/1965 Hennessey ........................ 206/587
4,535,888 8/1985 Nusselder ......................... 206/444
4,874,085 10/1989 Grobecker et al. ................ 206/311

FOREIGN PATENT DOCUMENTS 64-55295 4/1989 Japan .

Primary Examiner—William I. Price
Attorney, Agent, or Firm—Philip M. Shaw, Jr.

[57] ABSTRACT

A case for a disc cartridge comprises a cover, and a case body having the cover rotatably attached thereto and having on its bottom wall integrally formed a plurality of resilient hold members for resiliently holding a disc cartridge.

12 Claims, 10 Drawing Sheets

CASE FOR A DISC CARTRIDGE

BACKGROUND OF THE INVENTION

1. Field of the Invention

The present invention relates to a disc cartridge case that accommodates therein a disc cartridge in which a disc as a recording medium is accommodated when the disc cartridge is not in use.

2. Description of the Prior Art

When an optical disc accommodated in a disc accommodating case is a CD (compact disc), for example, a conventional disc accommodating case for accommodating therein an optical disc as a recording medium is constructed as follows. That is, an engagement projection that is in resilient engagement with a central aperture of a CD is provided at the central portion of a case body. A concave portion into which the CD is fitted is formed on the case body so as to surround the engagement projection, and a lid made of a transparent synthetic resin is provided on the case body so as to become freely rotatable (see U.S. Pat. Nos. 4,874,085 and 4,535,888, etc.).

When the optical disc is accommodated in the disc cartridge, an opening portion through which the central aperture of the disc is exposed is generally closed by a shutter in order to protect the optical disc, i.e., in order to prevent dust from entering the disc cartridge and to prevent the disc from being directly smudged by fingers or the like. For this reason, according to the conventional disc cartridge case, the optical disc cannot be held at the central aperture thereof unlike the aforesaid disc accommodating case.

FIGS. 1 and 2 of the accompanying drawings show a proposed case that accommodates therein a disc cartridge.

A case depicted by reference numeral 1 in FIGS. 1 and 2 comprises a case body 4 formed of a cartridge hold frame 2 and a bottom plate 3 and a transparent cover 5. In this case 1, the cartridge hold frame 2 of the case body 4 has on its central portion an accommodating concave portion 2a of rectangular configuration that is matched with the outer configuration of a disc cartridge C to be accommodated. Recesses 2b, 2c are integrally communicated with the accommodating concave portion 2a so that the user can withdraw the disc cartridge C accommodated within the accommodating concave portion 2a through the recesses 2b, 2c with fingers. Projections 2f, 2g, which serve as hinges for coupling the transparent cover 5 to the case body 4, are respectively formed on the rear end inner surfaces of the two side wall portions 2d, 2e. The bottom plate 3 is made of a transparent synthetic resin and comprised of a bottom wall portion 3a corresponding to the lower surface of the support frame 2 and a front wall portion 3b corresponding to the front wall portion of the hold frame 2 in an L-letter configuration in cross section so that the user can visually confirm an index sheet disposed between the lower surface of the hold frame 2 and the bottom wall portion 3a from the outside.

The transparent cover 5 is made of a transparent synthetic resin and comprised of a flat surface portion 5a corresponding to the upper surface of the hold frame 2 and two side wall portions 5b, 5c corresponding to inside surfaces of the two side wall portions 2d, 2e of the hold frame 2 in a substantially U-letter configuration in cross section. A plurality of tabs 5d, 5e, which are projected inwardly, are provided on the two side wall portions 5b, 5c, thereby holding a song text card, an index card or the like inserted from the front edge of the flat surface portion 5a.

The transparent cover 5 is rotatably coupled to the hold frame 2, i.e., the case body 4 by fitting the recesses 5f, 5g formed on the rear end outer surfaces of tee two side wall portions 5b, 5c into projections 2f, 2g, thus to construct the accommodating case 1. The recesses 5f, 5g and the projections 2f, 2g may be replaced with projections formed on the transparent cover 5 and recesses formed through the hold frame 2.

If the disc cartridge C is a little larger than the accommodating concave portion 2a of the cartridge hold frame 2, then the disc cartridge C cannot be accommodated in the disc cartridge case 1 shown in FIGS. 1 and 2. Even if the disc cartridge C is somehow accommodated, it cannot be withdrawn from the disc cartridge case 1. Further, when the disc cartridge C is accommodated in and taken out from the disc cartridge case 1, there is then the risk that the disc cartridge C itself will be deformed or damaged by a undesirable load applied thereto.

Because the disc cartridge C itself is thin, the depth of the accommodating concave portion 2a and those of the recess portions 2b, 2c of the cartridge hold frame 2 are also reduce Consequently, if the outer dimension of the disc cartridge C is a little larger than the size of the accommodating concave portion 2a as described before, then the user cannot as a practical matter, hold and take out the disc cartridge C from the disc cartridge case 1 with two fingers. Moreover, the strength with which the user can hold the disc cartridge C with fingers through the recesses 2b, 2c, i.e., the power of fingers is reduced so that the user cannot withdraw the disc cartridge C from the disc cartridge case 1. In addition, those who have large fingers cannot withdraw the disc cartridge C from the disc cartridge case 1 at all. Conversely, if the accommodating concave portion 2a is larger than the disc cartridge C, then the disc cartridge C cannot be stably accommodated in the disc cartridge case 1, such as when the disc cartridge C is loose in the accommodating concave portion 2a and dropped therefrom.

OBJECTS AND SUMMARY OF THE INVENTION

Therefore, it is an object of the present invention to provide an improved disc cartridge case in which the aforementioned shortcomings and disadvantages of the prior art can be eliminated.

More specifically, it is an object of the present invention to provide a disc cartridge case in and from which a disc cartridge can be accommodated and taken out with ease regardless of the size of the user's fingers.

Another object of the present invention is to provide a disc cartridge case in which a disc cartridge can be accommodated reliably.

A further object of the present invention is to provide a disc cartridge case which is suitable as a portable disc cartridge case.

According to a first aspect of the present invention, there is provided a case for a disc cartridge which comprises a cover, and a case body having the cover rotatably attached thereto and having on its bottom wall integrally formed a plurality of resilient hold members for resiliently holding a disc cartridge.

As a second aspect of the present invention, there is provided a case for a disc cartridge which comprises a first member made of a transparent synthetic resin and having on its inside wall an accommodating portion in which a paper slip is accommodated, and a second member composed of a pair of parallel side walls to which the first member is rotatably attached, a wall portion for coupling the pair of side walls, a bottom wall portion and a plurality of resilient hold portions formed on corners of the bottom wall portion.

In accordance with a third aspect of the present invention, there is provided a hold member for holding a disc cartridge which comprises a pair of parallel side walls, a wall portion for coupling the pair of side walls, a bottom wall portion, and a plurality of resilient hold members formed on corners of the bottom wall portion.

According to the disc cartridge case thus arranged, the disc cartridge is held by at least two resilient hold members formed on the case body in a sandwiching fashion and accommodated in the case by rotatably closing the transparent cover relative to the case body.

Since the disc cartridge is resiliently held by the resilient hold members, the disc cartridge can be reliably accommodated within the case so that the disc cartridge is prevented from being recklessly moved and from being dropped from the case. Also, the disc cartridge can be taken out from the case by pulling the disc cartridge against the resilient force of the resilient holding members.

The above and other objects, features, and advantages of the present invention will become apparent from the following detailed description of illustrative embodiments thereof when read in conjunction with the accompanying drawings, in which like reference numerals are used to identify the same or similar parts in the several views.

DETAILED DESCRIPTION OF THE PREFERRED EMBODIMENTS

Figure 1:
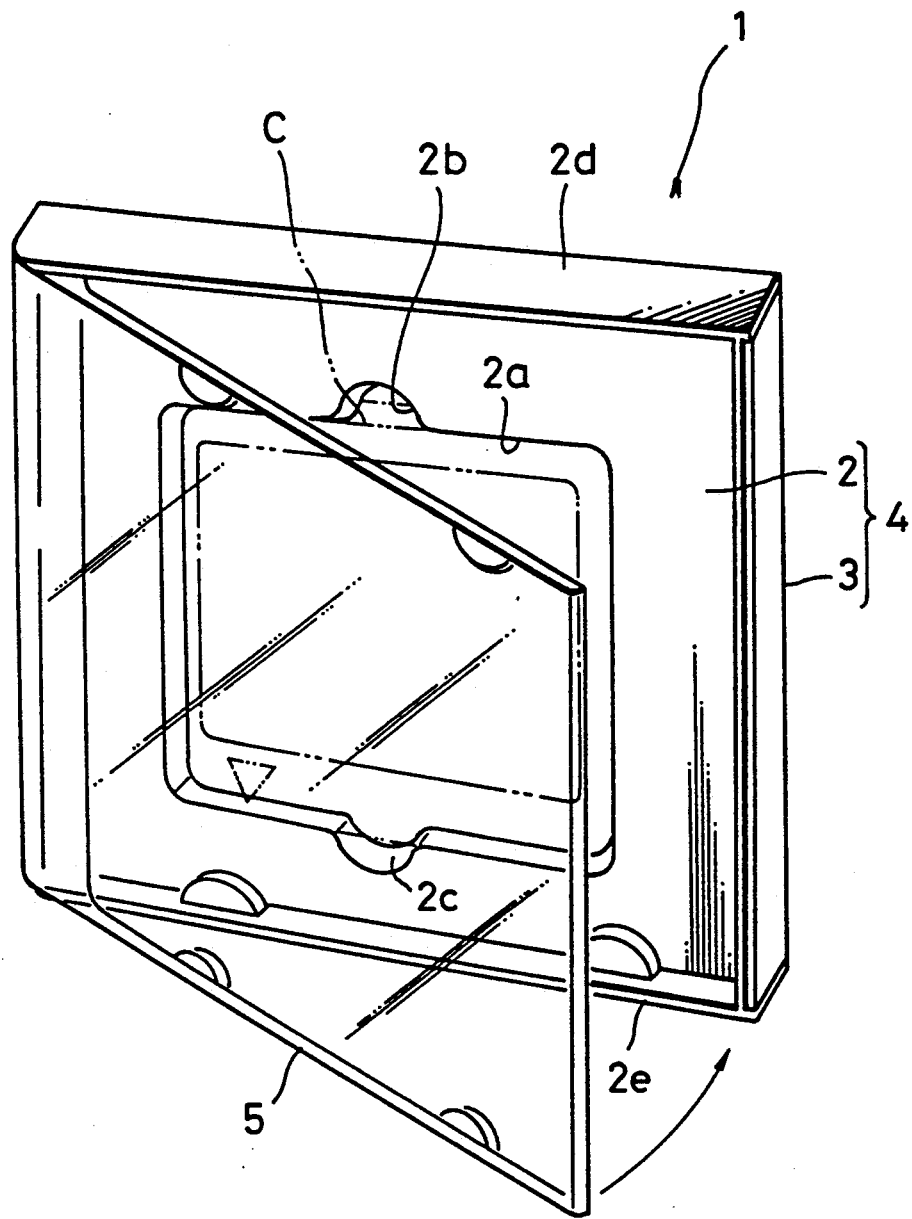
FIG. 1 is a perspective view of an example of a conventional disc cartridge case.
Figure 2:
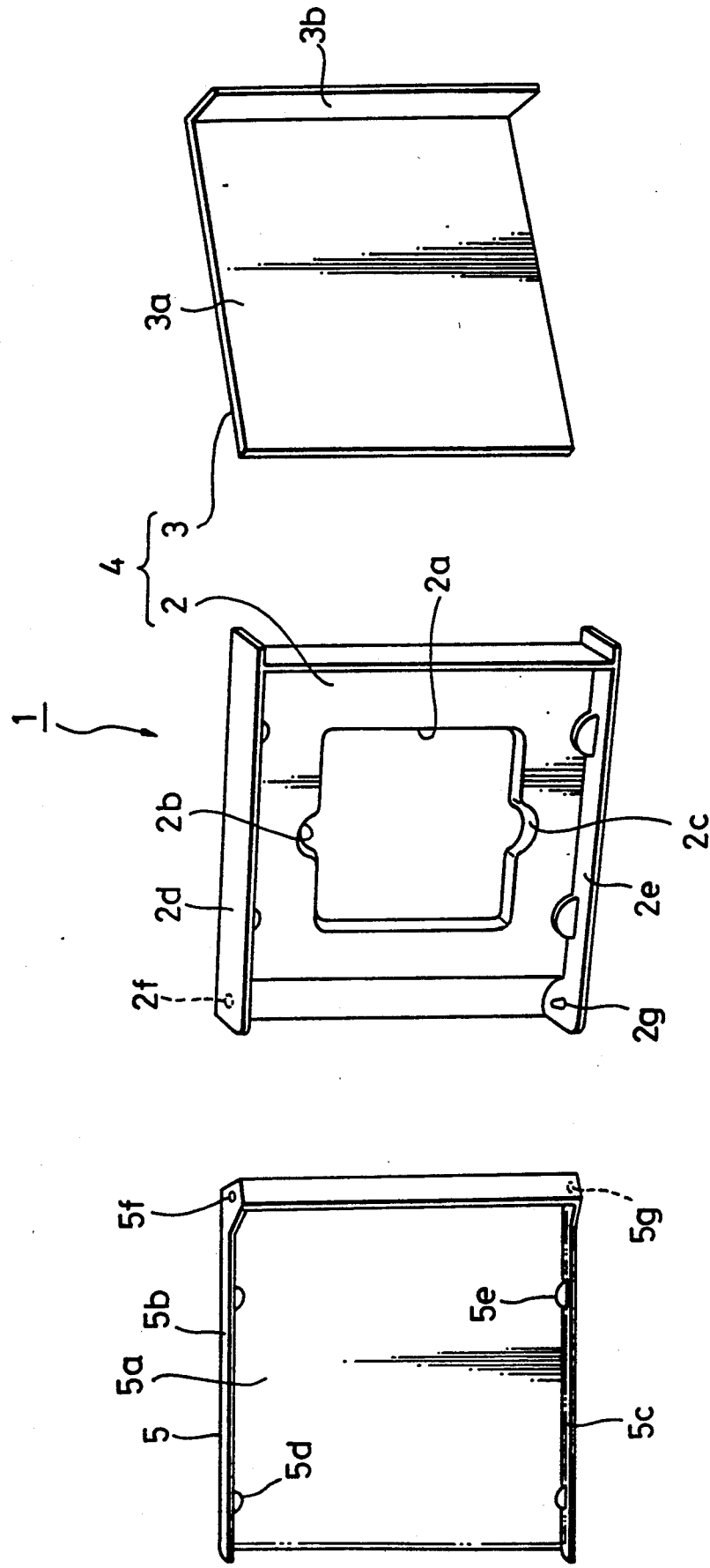
FIG. 2 is an exploded perspective view of the conventional disc cartridge case shown in FIG. 1.

A disc cartridge case according to a first embodiment of the present invention will now be described with reference to FIGS. 3 to 9.

The disc cartridge case according to the present invention comprises a single case body and a transparent cover that is attached to the case body so as to become freely rotatable.

As illustrated, a case body 12 of an accommodating case 11 forms an accommodating space a by extending a bottom portion 12d to respective end edges of three perpendicular wall portions 12a, 12b and 12c Then, end portions 12a, 12b₁ of the pair of opposing side walls (hereinafter referred to as two side wall portions) 12a, 12b are outwardly projected from the end edge of the flat surface portion 12d by a predetermined length. Thus, the side walls 12a, 12b, 12c and the bottom portion 12d are integrally molded from a synthetic resin material such as ABS resin (acrylonitrile-butadiene-styrene copolymer) or the like, thereby forming the case body 12.

On the inner surfaces of the projected end portions 12a₁, 12b₁ of the two side wall portions 12a, 12b, hinge projections (or alternatively concave portions) 13a, 13b, which are in engagement with hinge concave portions (or alternatively projections) of a transparent cover (described later on) are coaxially formed in a facing relation. Further, on the inner surfaces of the two side wall portions 12a, 12b, engagement concave portions (or projections) 14a, 14b are formed at inside positions from the hinge projections (or concave portions) 13a, 13b.

A resilient hold portion 15 that resiliently holds the disc cartridge C to be accommodated is disposed on the bottom wall portion 12d of the case body 12.

The resilient hold portion 15 comprises resilient hold members 15a, 15b, 15c, 15d which are integrally formed with the bottom wall portion 12d at four positions corresponding to four corners of the disc cartridge C to be accommodated according to the first embodiment of the present invention. Each of the resilient members 15a, 15b, 15c, 15d is substantially L-letter shaped in cross section. Four slots 16a, 16b, 16c, 16d are formed through the bottom wall portion 12d along the outer peripheral surfaces of the resilient members 15a, 15b, 15c, 15d, respectively, whereby portions 12d₁, 12d₂, 12d₃, 12d₄ of the bottom wall portion 12d in which the resilient members 15a, 15b, 15c, 15d are formed can be displaced in the direction perpendicular to the plane direction of the bottom wall portion 12d.

At in the outer central portion of the wall portion (hereinafter referred to as front wall portion), 12c that couples the two side wall portions 12a, 12b, a concave portion 17 is formed, which is concaved toward the end edge opposing the bottom wall portion 12d, i.e., toward the upper end edge, so as to grip the finger when the user opens the transparent cover (described later on).

Figure 8B:
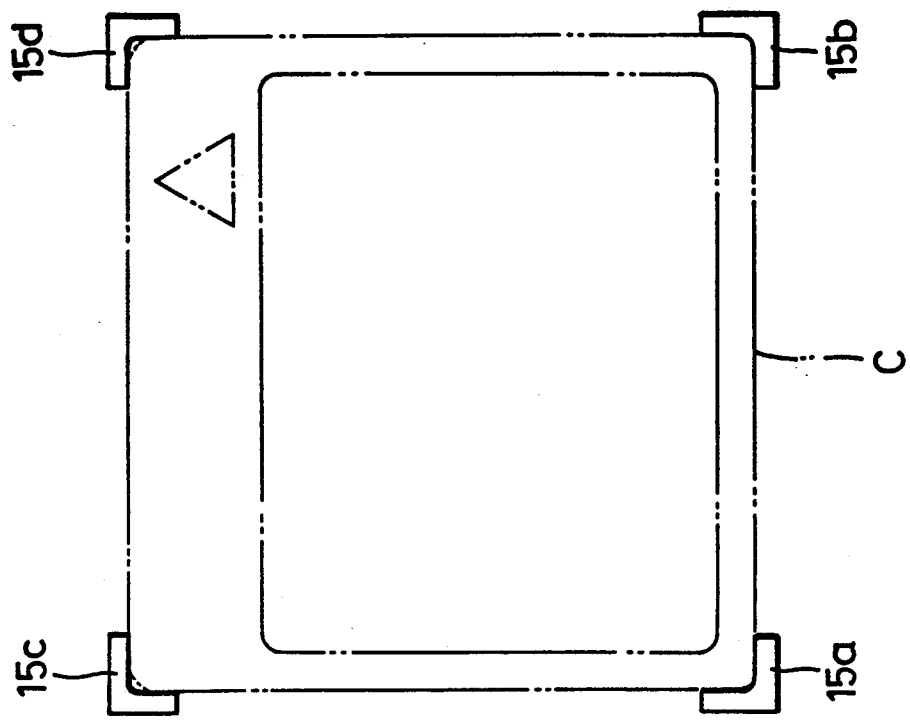
FIGS. 8A and 8B are diagrams used to explain a resilient hold portion provided in the case body to resiliently hold the disc cartridge.
Figure 8A:
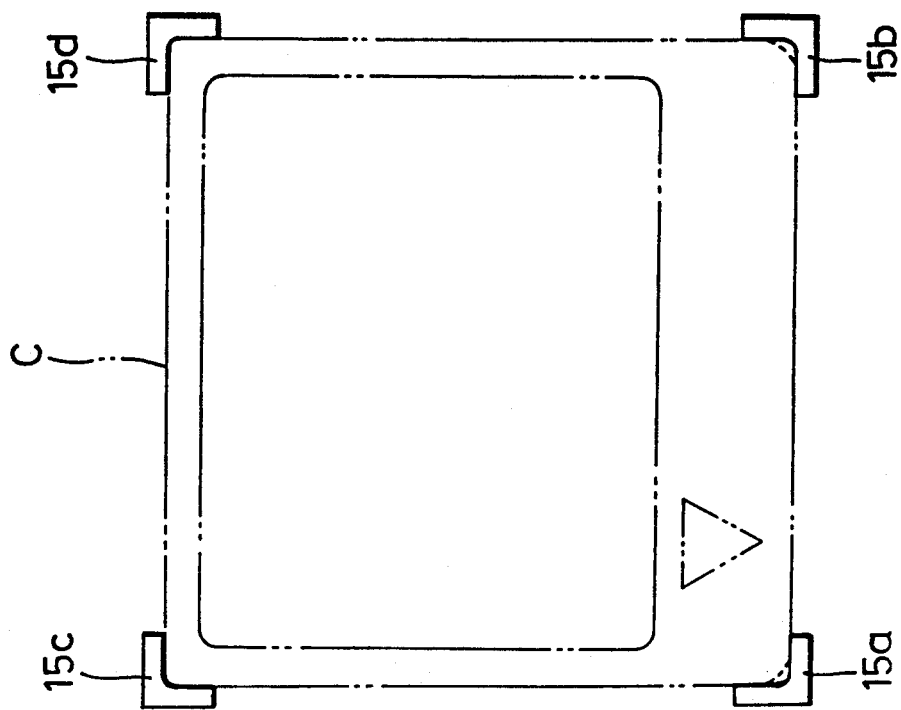
Figure 9:
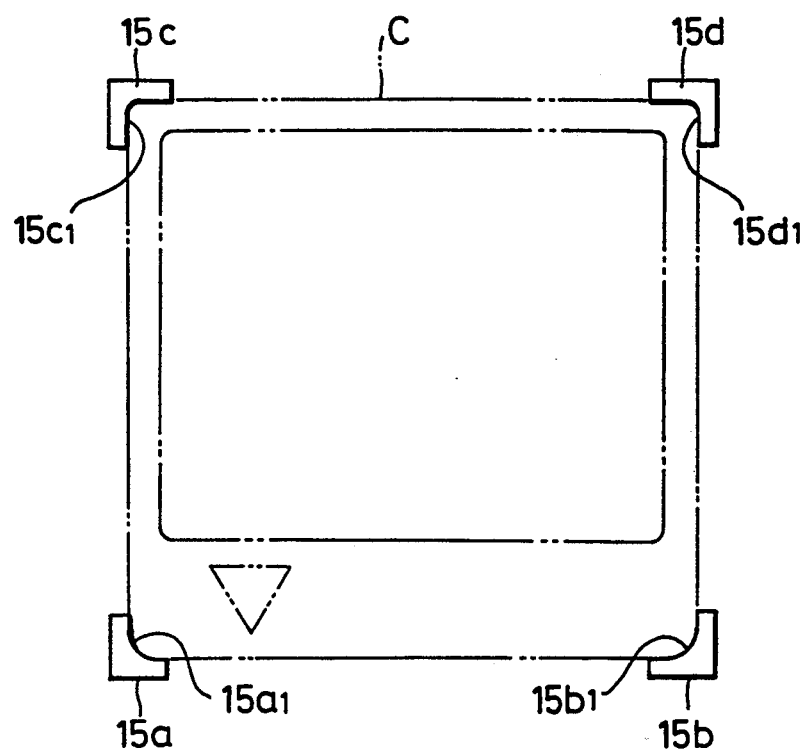
FIG. 9 is a diagram used to explain a modified example of the resilient hold portion.

If the resilient hold members 15a through 15d provided on the bottom wall portion 12d of the case body 12 are substantially right-angled square with respect to each other, as shown in FIGS. 8A and 8B, then disc cartridge C whose front and rear corners are different in shape can be accommodated in the resilient hold portion 15 from the reverse direction.

Alternatively, the resilient hold members 15a through 15d may respectively be formed in association with the shapes of the corresponding corners of the disc cartridge C. That is, as shown in the modified example of FIG. 9 of the accompanying drawings, the inner surfaces $15a_1$, $15b_1$ of the resilient hold members 15a, 15b corresponding to the two front corners may be rounded, whereas the inner surfaces $15c_1$, $15d_1$ of the resilient hold members 15c, 15d corresponding to the two rear corners may be substantially right-angled square.

In this case, the direction in which the disc cartridge C is accommodated into the case 1 is restricted to a predetermined direction.

Figure 3:
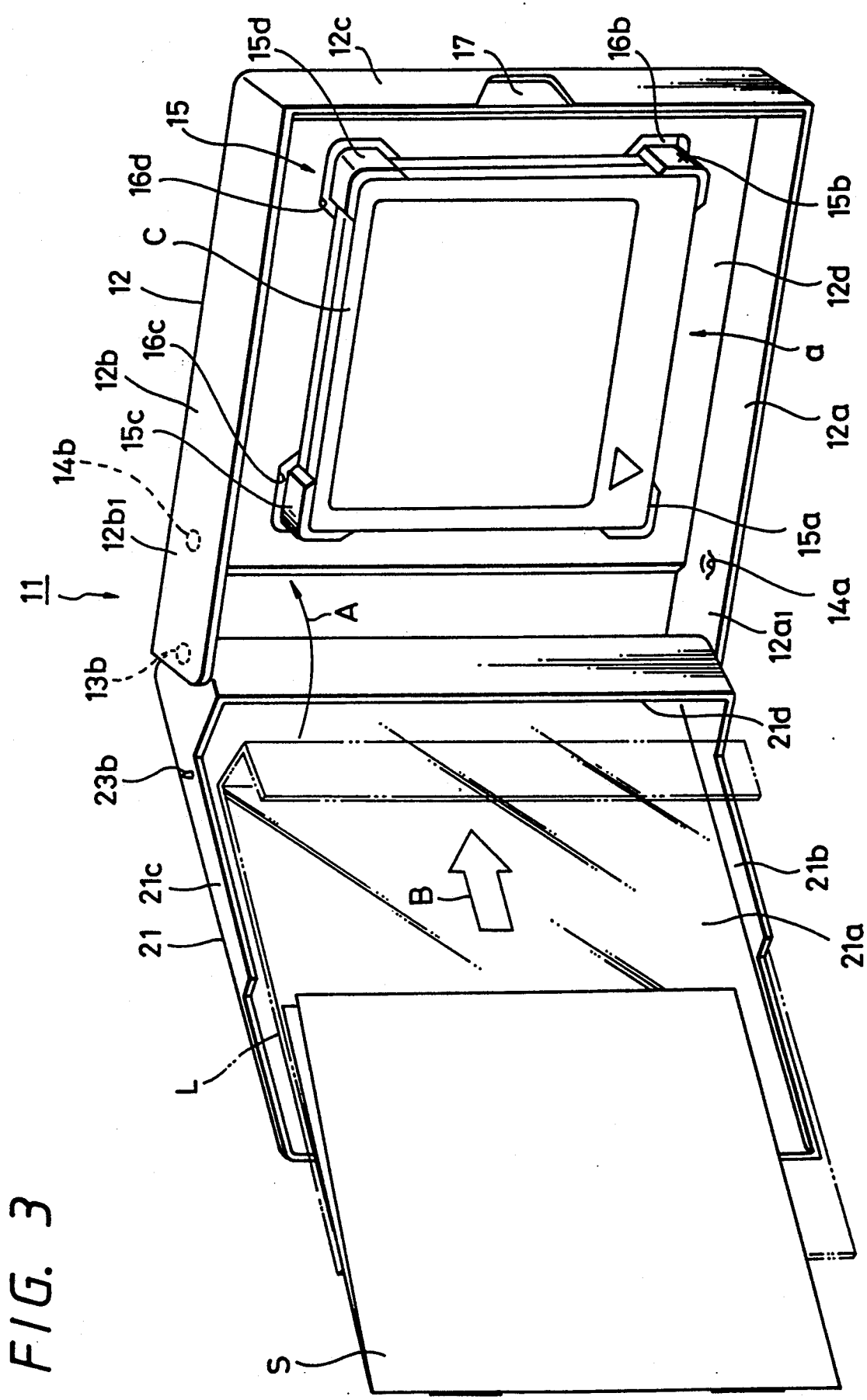
FIG. 3 is a perspective view of a disc cartridge case according to a first embodiment of the present invention and illustrating the condition such that a cover of the case is opened.
Figure 4:
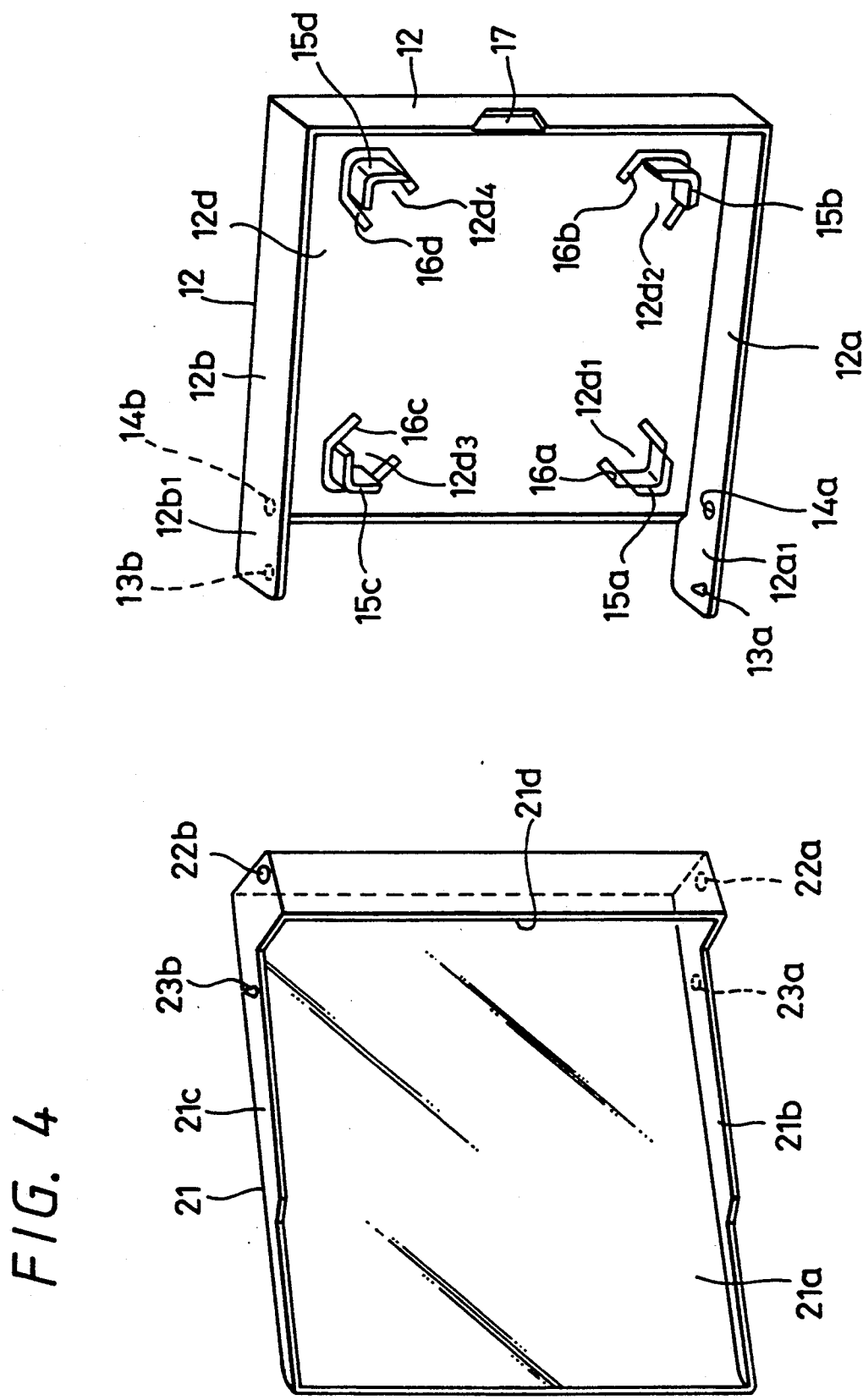
FIG. 4 is an exploded perspective view of the disc cartridge case according to the first embodiment of the present invention.
Figure 5:
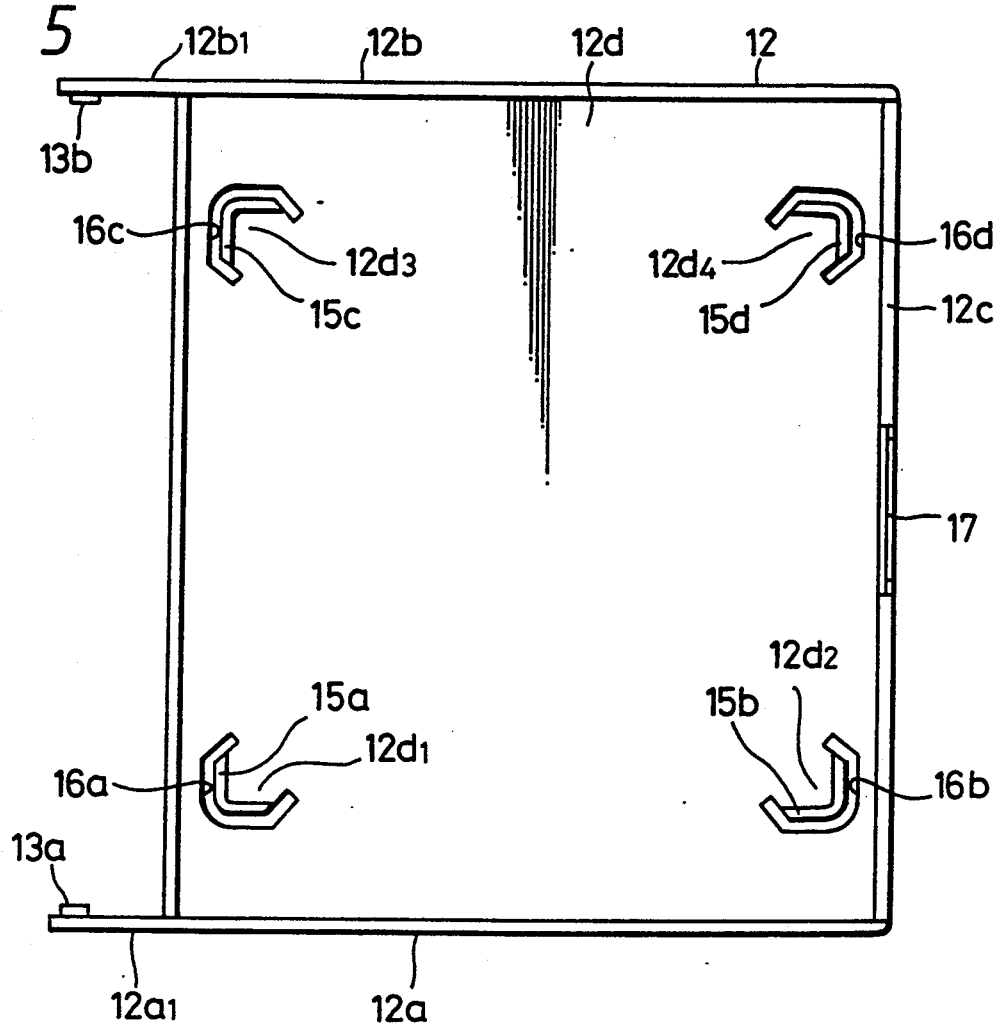
FIG. 5 is a plan view of a case body of the disc cartridge case according to the first embodiment of the present invention.
Figure 6:
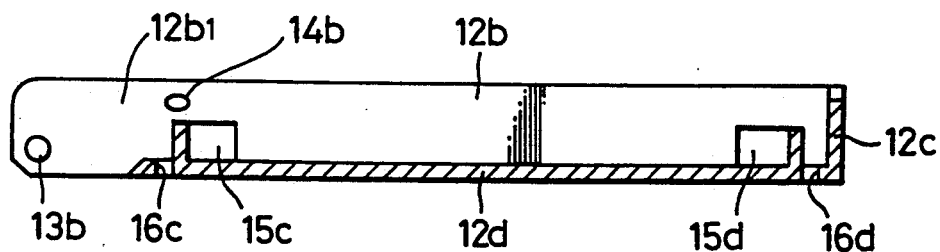
FIG. 6 is a cross-sectional view of the case body of the disc cartridge case according to the, first embodiment of the present invention invention taken generally along the lines VI—VI in FIG. 5.
Figure 7:
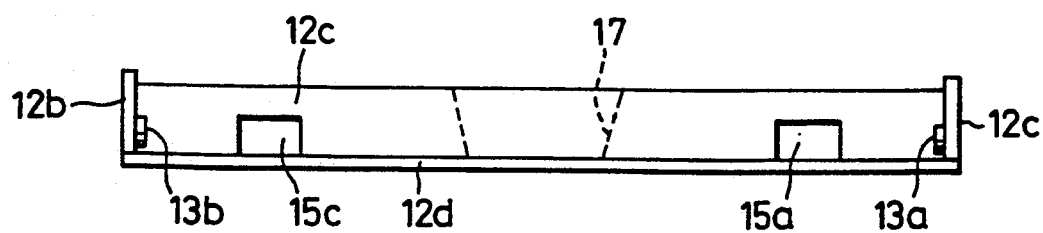
FIG. 7 is a rear view of the case body of the disc cartridge case according to the first embodiment of the present invention.

A transparent cover 21 that is rotatably attached to the case body 12 thus arranged is integrally molded from a transparent synthetic resin material. As shown in FIGS. 3 and 4 of the accompanying drawings, the transparent cover 21 comprises a flat surface portion 21a, two side wall portions 21b, 21c inclined upwardly from substantially central portions to the rear portions of the two side wall portions 21b, 21c and a pocket portion 21d formed between the rear end portions of the two side wall portions 21b, 21c.

On the rear outer surfaces of the two side wall portions 21b, 21c of the transparent cover 21, hinge concave portions (or projections 22a, 22b which are in engagement with the hinge projections (or concave portions) 13a, 13b of the case body 12 are coaxially formed in a facing relation. Further, on the outer surfaces of the two side wall portions 21b, 21c, engagement projections (or concave portions) 23a, 23b which are in engagement with the engagement concave portions (or projections) 14a, 14b of the case body 12 are formed at the positions inside from the hinge concave portions (or projections) 22a, 22b.

The hinge concave portions (or projections) 22a, 22b of the transparent cover 21 are engaged with the hinge projections (or concave portions) 13a, 13b of the case body 12 and the transparent cover 21 is rotatably attached to the case body 12. The transparent cover 21 is rotated toward the upper surface side of the case body 12 so as to close the accommodating space a in the direction shown by an arrow A in FIG. 3. Then, the engagement projections (or concave portions) 23a, 23b are engaged with the engagement concave portions (or projections) of the case body 12, whereby the transparent cover 21 is brought in the position at which it can close the accommodating space a of the case body 12.

When the disc cartridge C is accommodated into the accommodating case 11, the disc cartridge C is fitted at its four corner portions into the resilient hold members 15a through 15d disposed on the bottom wall portion 12d of the case body 12 by the resilient biasing-force under the condition that the transparent cover 21 is opened.

A song text card or index sheet S is accommodated into the pocket portion 21d on the inner surface side of the transparent cover 21 as shown by an arrow B in FIG. 3. A label L also can be accommodated within the pocket portion 21d.

As set out, since the disc cartridge case 11 of the first embodiment holds and accommodates the disc cartridge C at four corners by the four resilient hold members 15a to 15d disposed on the case body 12, the circumferential side surface portion of the disc cartridge C is very widely exposed in the resilient hold members 15a to 15d. Therefore, the user can hold the disc cartridge C easily and reliably regardless of the size of fingers when accommodating or withdrawing the disc cartridge C. Accordingly, the disc cartridge C can be smoothly accommodated into and withdrawn from the disc cartridge case 11. Further, under the condition that the disc cartridge C is accommodated into the disc cartridge case 11, the disc cartridge C is held by the resilient biasing-force of the resilient hold members 15a to 15d with the result that the disc cartridge C can be prevented from being recklessly moved and from being dropped from the disc cartridge case 11. Hence, the disc cartridge C can be held within the disc cartridge case 11 reliably.

Also, when the song text card, the index sheet S and so on are accommodated into the pocket portion 21d of the transparent cover 21 side, the user has to at least insert them into the pocket portion 21d. Thus, they can be inserted into and taken out from the pocket portion 21d of the transparent cover 21 with great ease, which makes the disc cartridge case 11 of the invention very useful in use.

In addition, since the disc cartridge case 11 of the first embodiment is composed of only two members of the single case body 12 and the transparent cover 21, the cost of materials thereof can be reduced and the assembly process thereof can be simplified, which can provide an inexpensive disc cartridge case.

While the four resilient hold members are disposed on the bottom wall portion of the case body in association with the respective corners of the disc cartridge as described above, the number of the resilient hold members can be reduced, as will be described below.

Figure 10:
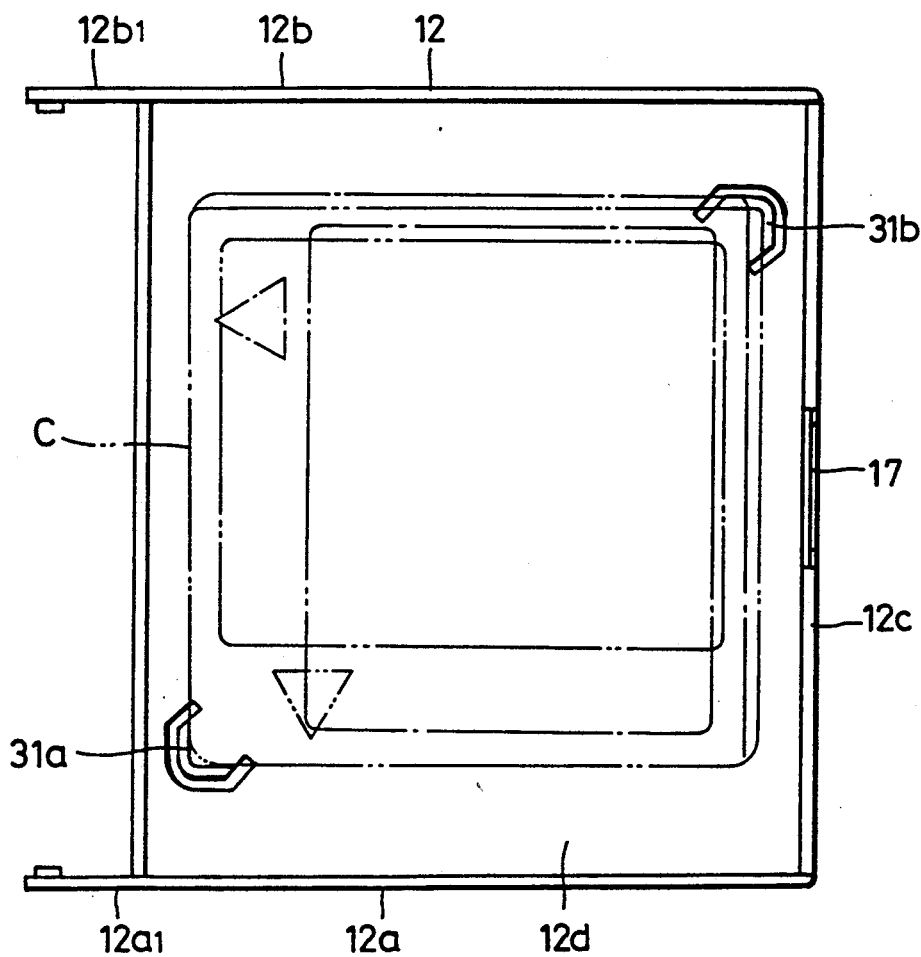
FIG. 10 is a plan view of a case body of a disc cartridge case according to a second embodiment of the present invention.

FIG. 10 of the accompanying drawings shows a second embodiment of the present invention.

As shown in FIG. 10, the disc cartridge C can be held by two resilient hold members 31a, 31b which are disposed on the bottom wall portion 12d of the case body 12 so as to oppose to each other along the diagonal line direction of the disc cartridge C.

In this case, the width of the disc cartridge C becomes different in front and rear and in left and right so that, if the disc cartridge C is accommodated into the disc cartridge case 11 from the wrong direction as shown by a one-dot chain line in FIG. 10, then the disc cartridge C cannot be accommodated within the disc cartridge case 11. If the disc cartridge C is inserted into the disc cartridge case 11 from the reverse direction in front and rear, the disc cartridge C can be accommodated into the disc cartridge case 11.

Figure 11:
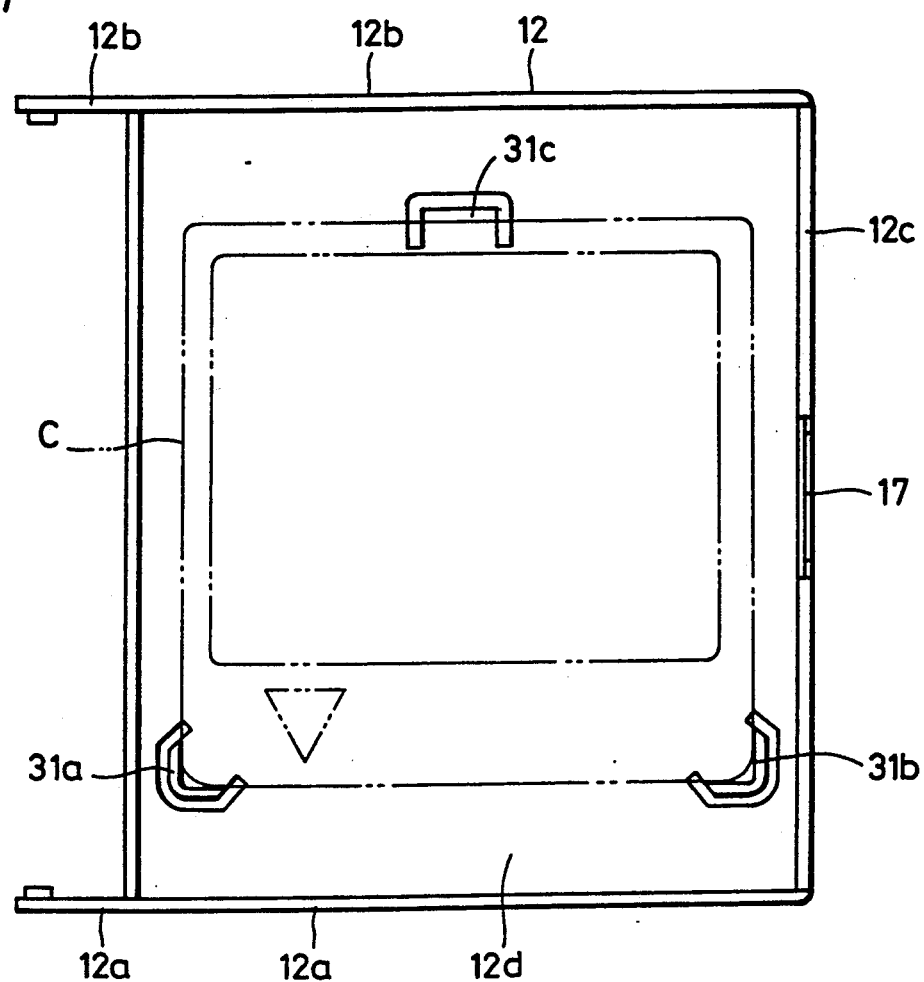
FIG. 11 is a plan view of a case body of a disc cartridge case according to a third embodiment of the present invention.

FIG. 11 of the accompanying drawings shows a third embodiment of the present invention.

As shown in FIG. 11, three resilient hold members 31a, 31b, 31c may be disposed on the bottom wall portion 12d of the case body 12.

More specifically, the resilient hold members 31a, 31b, which are square in cross section for holding the corner portions, are provided on the bottom wall portion 12d at its portions corresponding to two corner portions of one side surface of four front, rear, left and right side surfaces. Also, the remaining resilient hold member 31c, which is rectangular in cross section for holding the flat surface, is in contact with substantially a central portion of the other side surface opposing the above-mentioned one side surface. Thus, the disc cartridge C is held at three points.

According to the second and third embodiments shown in FIGS. 10 and 11, the area in which the circumferential side surface of the disc cartridge C is exposed under the condition that the disc cartridge C is held by the resilient hold members is much more increased as compared with that of the first embodiment in which the disc cartridge C is held at the four corner portions. Therefore, the user can hold the disc cartridge C with fingers more easily. Hence, the disc cartridge C can be accommodated into and taken out from the disc cartridge case 11 more easily.

Figure 12:
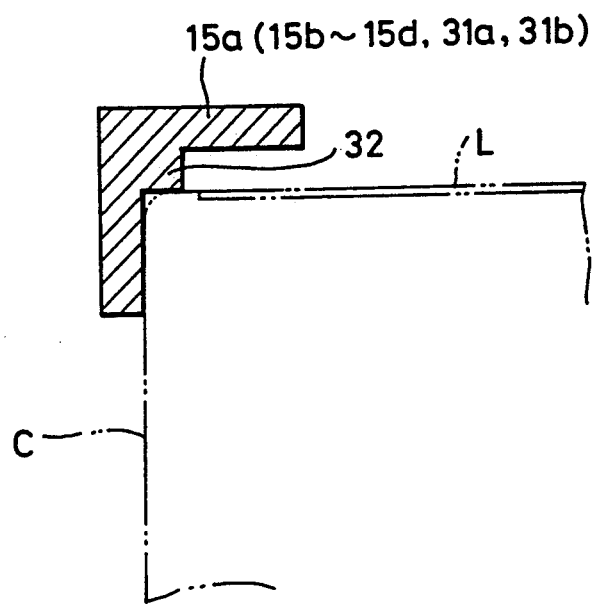
FIG. 12 is an enlarged, cross-sectional view of a further example of the elastic hold portion of the case body.

FIG. 12 of the accompanying drawings shows another example of the modified resilient hold members.

As shown in FIG. 12, if a projection 32 is formed on the inner side corner portions of the rectangular resilient hold members 15a to 15d, 31a and 31b which hold the corner portions of the disc cartridge C, then the resilient hold members can be prevented from contacting with the label L bonded on to the disc cartridge C. Hence, the label L can be prevented from being damaged and torn off.

In the case of the case body 12 of the disc cartridge case according to the first to third embodiments of the present invention, a plurality of resilient hold members 15 are formed on the bottom wall portion 12d of the case body 12 and the disc cartridge C is accommodated within the space formed by these resilient hold members 15. In that case, the major surface portion of the disc cartridge C is brought in contact with the bottom wall portion 12d of the case body 12. According to the first to third embodiments of the present invention, when the disc cartridge C is taken out from the case body 12, the user takes out the disc cartridge C from the case body 12 by pulling the spacings between the outer circumferential surface of the disc cartridge C and the two side wall portions 12a, 12b of the case body 12 with fingers. In this case, however, the disc cartridge C is thin and, moreover, a spacing is not substantially formed between the major surface portion of the disc cartridge C and the bottom wall portion 12d of the case body 12, thereby hindering the disc cartridge C from being taken out from the disc case 12 satisfactorily. A fourth embodiment of the disc cartridge case according to the present invention, which can obviate the above-mentioned disadvantage that the foregoing embodiments could not fully overcome, will be described with reference to FIGS. 13 through 15. Throughout FIGS. 13 to 15, like parts corresponding to those of the first embodiment are marked with the same references and therefore need not be described in detail.

Figure 13:
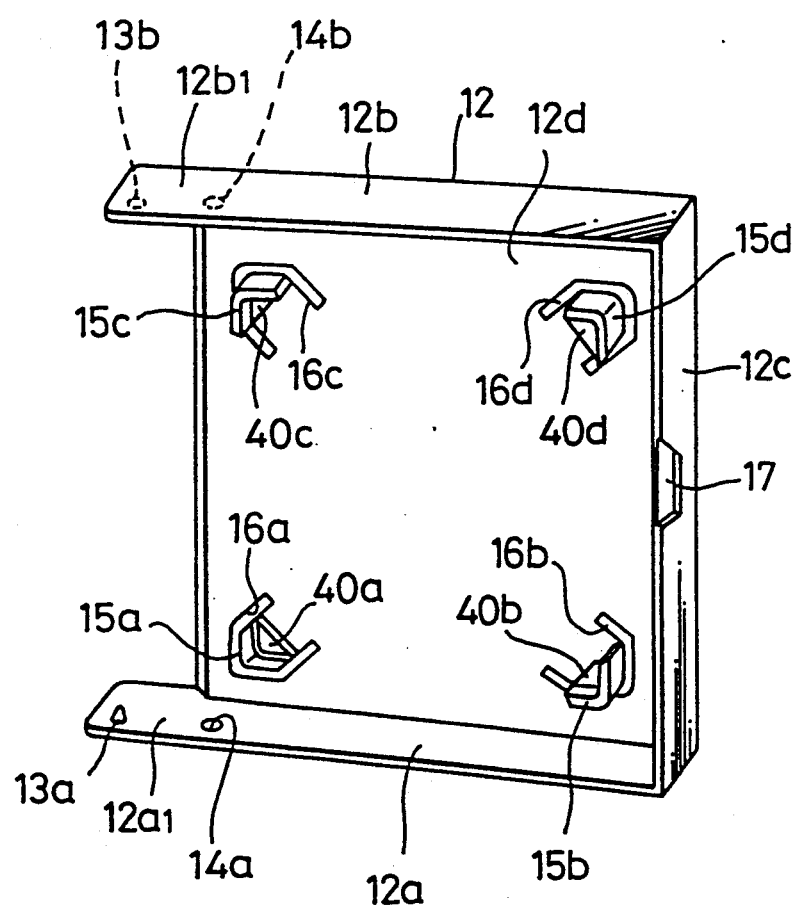
FIG. 13 is a perspective view of a case body of a disc cartridge case according to a fourth embodiment of the present invention.
Figure 14:
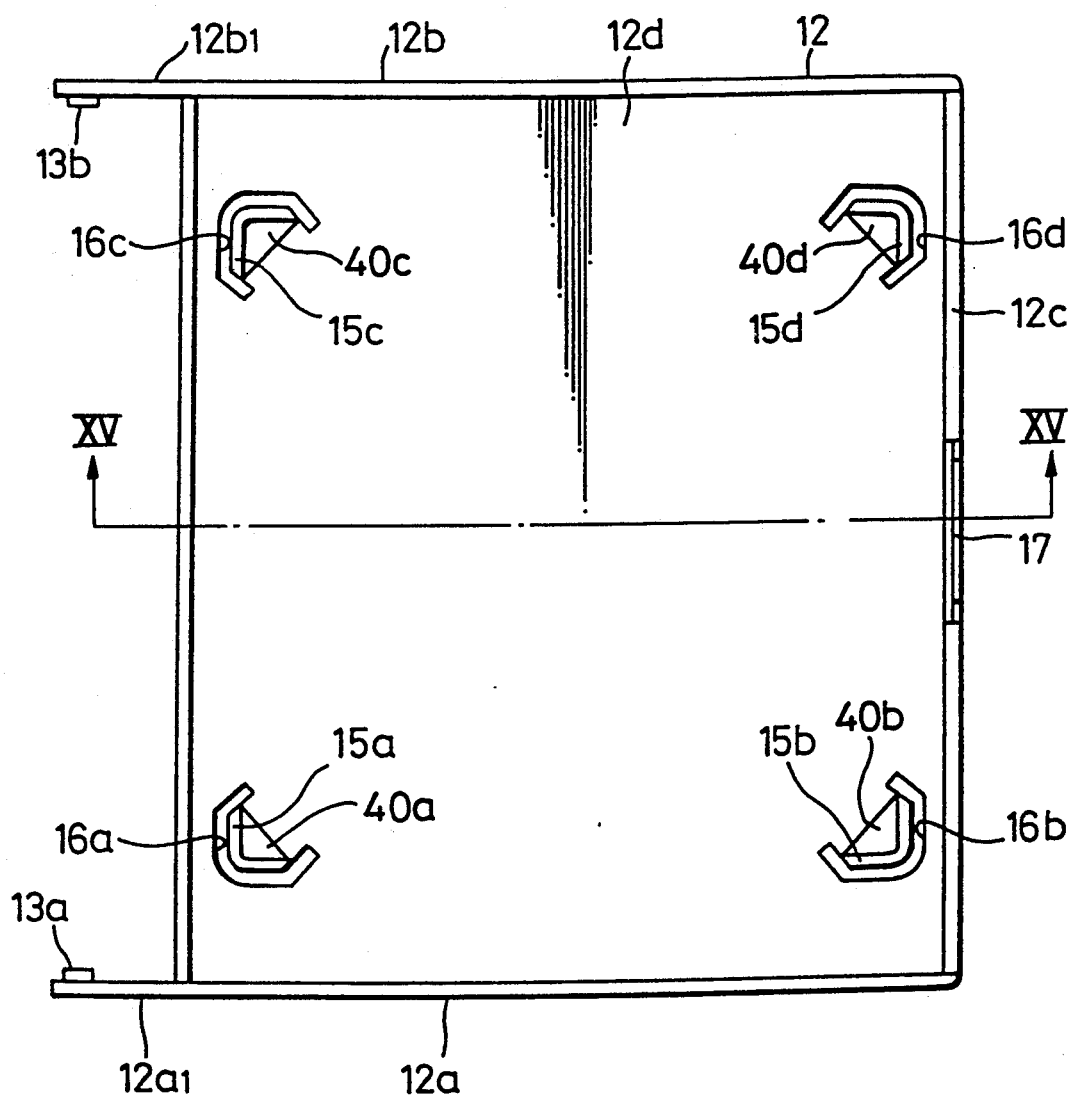
FIG. 14 is a schematic plan view illustrating the case body of the fourth embodiment of the present invention.
Figure 15:
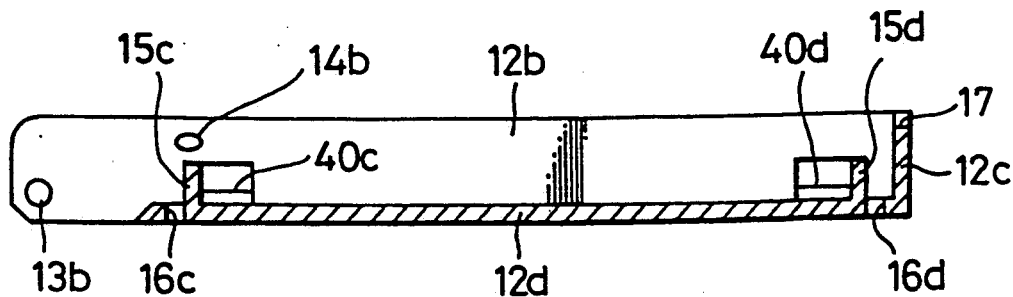
FIG. 15 is a cross-sectional view taken through the line XV—XV in FIG. 14.

FIG. 13 shows a perspective view of the case body 12; FIG. 14 shows a plan view of the case body 12; and FIG. 15 shows a cross-sectional view of the case body 12 taken along the line XV—XV in FIG. 14.

As illustrated, the transparent cover 21 is rotatably attached to the case body 12 similarly to the first embodiment.

A plurality of resilient hold members 15a through 15d which are of substantially L-letter shape in cross section are integrally formed on the bottom wall portion 12d of the case body 12. These resilient hold members 15a through 15d have integrally formed therewith holder portions 40a through 40d on which the disc cartridge C is held. These holder portions 40a through 40d are formed on the inner L-letter shaped portions of the resilient hold portions 15a to 15d of substantially L-letter configuration in cross section with a predetermined level difference from the bottom wall surface 12d of the case body 12.

Accordingly, when the disc cartridge C is accommodated in the case body 12, the disc cartridge C is resiliently held by the resilient hold members 15a through 15d and also held on the holder portions 40a through 40d. At that time, a predetermined spacing takes place between the disc cartridge C and the bottom wall portion 12d of the case body 12 with the result that the disc cartridge C is held while it is spaced apart from the bottom surface portion 12d of the case body 12.

According to the fourth embodiment of the present invention, when the disc cartridge C is taken out from the case body 12, the disc cartridge C can be taken out from the disc case 12 more easily because of the spacing produced between the case body 12 and the bottom wall portion 12d.

Further, the synthetic resin that can mold the case body and the cover is not limited to those described above and a wide variety of synthetic resins may be utilized.

Furthermore, the arrangements and configurations of the case body and the cover may be modified if necessary.

As set forth, the disc cartridge case according to the present invention can accommodate the disc cartridge reliably. Also, the user can place in and take out the disc cartridge from the disc cartridge case easily and readily regardless of the size of fingers. Therefore, the disc cartridge case of the present invention is best suitable as a portable disc cartridge case.

Having described preferred embodiments of the invention with reference to the accompanying drawings, it is to be understood that the invention is not limited to those precise embodiments and that various modifications and variations could be effected by one skilled in the art without departing from the spirit or scope of the invention as defined in the appended claims.

What is claimed is:

1. A case for a disc cartridge comprising:
   a cover; and
   a case body having said cover rotatably attached thereto and having on its bottom wall integrally formed a plurality of resilient hold members for resiliently holding a disc cartridge.

2. The case according to claim 1, wherein an opening portion is formed through said bottom wall of said case body along a portion in which said resilient hold members are formed.

3. The case according to claim 1, wherein said case body further includes means for forming a predetermined spacing between it and said bottom wall of said case body.

4. The case according to claim 3, wherein said means is a holder portion formed on said resilient hold members.

5. A case for a disc cartridge comprising:
   a first member made of a transparent synthetic resin and having on its inside wall an accommodating portion in which a paper slip is accommodated; and a second member composed of a pair of parallel side walls to which said first member is rotatably attached, a wall portion for coupling said pair of side walls, a bottom wall portion and a plurality of resilient hold portions formed on corners of said bottom wall portion.

6. The case according to claim 5, further comprising means for forming a predetermined spacing between it and said bottom wall portion of said case body.

7. The case according to claim 5, wherein said means is a holder portion formed on said resilient hold members.

8. The case according to claim 5, wherein an opening portion is formed through said bottom wall of said case body along a portion in which said resilient members are formed.

9. A hold member for holding a disc cartridge comprising:
   a pair of parallel side walls;
   a wall portion for coupling said pair of side walls;
   a bottom wall portion; and
   a plurality of resilient hold members formed on corners of said bottom wall portion.

10. The hold member according to claim 9, further comprising means for forming a predetermined spacing between it and said bottom wall portion of said hold member.

11. The hold member according to claim 5, wherein said means is a holder portion formed on said resilient hold members.

12. The hold member according to claim 5, wherein an opening portion is formed through said bottom wall of said case body along a portion in which said resilient members are formed.

* * * * *